US012803148B2

(12) United States Patent
Karau et al.

(10) Patent No.: US 12,803,148 B2
(45) Date of Patent: Nov. 17, 2026

(54) WAVEGUIDE ASSEMBLY COMPRISING A TRANSITION BETWEEN A CONDUCTIVE PLATE EMBEDDED IN A DIELECTRIC WAVEGUIDE AND A CONDUCTIVE PLATE OF AN ELECTRICAL CIRCUIT

(71) Applicant: Rosenberger Hochfrequenztechnik GmbH & Co. KG, Fridolfing (DE)

(72) Inventors: Simon Karau, Fridolfing (DE); Andre Meyer, Fridolfing (DE); Martin Schneider, Fridolfing (DE)

(73) Assignee: Rosenberger Hochfrequenztechnik GmbH & Co. KG, Fridolfing (DE)

(*) Notice: Subject to any disclaimer, the term of this patent is extended or adjusted under 35 U.S.C. 154(b) by 107 days.

(21) Appl. No.: 18/911,703

(22) Filed: Oct. 10, 2024

(65) Prior Publication Data

US 2025/0038390 A1 Jan. 30, 2025

Related U.S. Application Data

(63) Continuation of application No. 17/423,085, filed as application No. PCT/EP2020/050994 on Jan. 16, 2020, now Pat. No. 12,148,970.

(30) Foreign Application Priority Data

Jan. 18, 2019 (DE) ..................... 10 2019 101 276.7

(51) Int. Cl.
*H01P 5/08* (2006.01)
*H01P 3/16* (2006.01)
*H01P 11/00* (2006.01)

(52) U.S. Cl.
CPC ................ *H01P 5/087* (2013.01); *H01P 3/16* (2013.01); *H01P 11/006* (2013.01)

(58) Field of Classification Search
CPC ........... H01P 5/087; H01P 3/16; H01P 11/006
USPC ............................................. 333/24 C, 21 A
See application file for complete search history.

(56) References Cited

U.S. PATENT DOCUMENTS 7,750,755 B2 7/2010 Fujita
8,368,482 B2 2/2013 Sano
10,826,149 B2 11/2020 Rusch
11,205,829 B2 12/2021 Zebhauser
12,148,970 B2 * 11/2024 Karau et al. ............ H01P 5/087
2008/0153416 A1 * 6/2008 Washiro .................... H01P 3/16 455/41.1
2011/0140811 A1 6/2011 Leiba
(Continued)

OTHER PUBLICATIONS

German Search Report Dated Dec. 13, 2019.
(Continued)

*Primary Examiner* — Benny T Lee
(74) *Attorney, Agent, or Firm* — Randall Danskin P.S.

(57) ABSTRACT

A waveguide assembly, comprising an electrical circuit assembly, a dielectric waveguide with a longitudinal axis (A), and a waveguide transition lying therebetween for transmitting an electromagnetic wave between the electrical circuit assembly and the dielectric waveguide. The waveguide transition has a first electrically conductive plate and a second electrically conductive plate which are arranged between the electrical circuit assembly and the dielectric waveguide in an offset manner to each other in the direction of the longitudinal axis (A) of the dielectric waveguide.

21 Claims, 3 Drawing Sheets

(56) References Cited

U.S. PATENT DOCUMENTS

| | | | | |
|---|---|---|---|---|
| 2013/0265734 | A1 | 10/2013 | Herbsommer | |
| 2014/0285294 | A1* | 9/2014 | Haroun et al. | H01P 3/165<br>333/256 |
| 2016/0351988 | A1 | 12/2016 | Yang | |
| 2017/0141450 | A1 | 5/2017 | Bae | |
| 2017/0201028 | A1 | 7/2017 | Eberhardt | |
| 2017/0336503 | A1 | 11/2017 | Hammerschmidt | |

OTHER PUBLICATIONS

Miscellaneous PCT Documents PCT/EP2020/050994.
European Patent Office Action dated Dec. 20. 2022.
Office Action Issued by the State Intellectual Property Office of China dated Oct. 27, 2022.

* cited by examiner

WAVEGUIDE ASSEMBLY COMPRISING A TRANSITION BETWEEN A CONDUCTIVE PLATE EMBEDDED IN A DIELECTRIC WAVEGUIDE AND A CONDUCTIVE PLATE OF AN ELECTRICAL CIRCUIT

CROSS REFERENCE TO RELATED APPLICATIONS

This U.S. Utility Patent Application is a Continuation Application of U.S. Utility patent application Ser. No. 17/423,085, which was filed on 14 Jul. 2021, titled "Waveguide Assembly, Waveguide Transition, and Use of a Waveguide Assembly", for which a Notice of Allowance (NOA) has been issued by the USPTO, but the US Patent has not yet issued. This Continuation Patent Application claims priority to earlier filed U.S. Utility patent application Ser. No. 17/423,085, and also claims priority to earlier filed PCT Patent Application No. PCT/EP2020/050994, which was filed on 16 Jan. 2020, and still further claims priority to still earlier filed German Patent Application No. 10 2019 101 276.7, which was filed on 18 Jan. 2019. The entire contents of the aforementioned earlier filed US Patent Number Utility Patent Application, earlier filed PCT Patent application and to still earlier filed German Patent Application are all expressly incorporated herein by this reference.

The inventorship of the above identified, U.S. Patent Number Utility patent application Ser. No. 17/423,085 is the same as the inventorship of the present Continuation application.

Pursuant to USPTO rules, a domestic priority claim to US Parent application U.S. Ser. No. 17/423,085 is made in the Application Data Sheet (ADS) filed herewith. A domestic priority claim is also made to earlier filed PCT Patent Application No. PCT/EP2020/050994 and is set forth in the accompanying ADS. A foreign priority claim is made to still earlier filed German Patent Application No. 10 2019 101 276.7 and is also included in the Application Data Sheet (ADS) filed herewith.

TECHNICAL FIELD

The invention relates to a waveguide assembly, comprising an electrical circuit arrangement, a dielectric waveguide, and a waveguide transition therebetween for the transmission of an electromagnetic wave between the electrical circuit arrangement and the dielectric waveguide.

The invention also relates to a waveguide transition for the transmission of an electromagnetic wave between an electrical circuit arrangement and a dielectric waveguide.

The invention furthermore relates to the use of a waveguide assembly.

BACKGROUND

According to the current state of the art, wired data transmission can essentially be divided into two different technologies. On the one hand, data transmission by means of metallic conductors and, on the other hand, optical data transmission by means of glass fibers are known.

The transmission of signals via conventional electrical conductors, such as copper conductors in electrical cables, for example, is known to be subject to strong signal attenuation at high frequencies. Thus, especially when high demands are placed on the transmission bandwidth, sometimes a lot of effort has to be made in order to achieve the specifications—if at all possible.

Optical data transmission, in contrast, has extremely low losses and is possible at high data rates. Optical data transmission, however, always requires a conversion of electrical signals into optical signals and vice versa, which makes complex transmission and reception structures necessary for this type of signal transmission.

In addition to the two conventional data transmission technologies, there is increasing interest in a technology that is attempting to establish itself as an alternative. The present invention relates to data transmission via so-called dielectric waveguides (DWG or "polymer microwave fibers", PMF).

In this technology, the electrical signal is modulated onto a carrier frequency, in particular in the millimeter wave range (for example 80 GHz) and transmitted as an electromagnetic wave along the dielectric waveguide. In contrast to an optical method, the method manages without electro-optical conversion. Compared to metallic waveguides, the concept has the advantage of being able to transmit very high data rates, for example in the range of 50 GB/s, at least over medium distances, for example in the range of 10 m. Dielectric waveguides therefore appear in particular to be of great interest because the semiconductor technologies required for the high gigahertz range are now increasingly available and allow inexpensive and high integration, for example in RF CMOS technology.

Electromagnetic waves that propagate along a dielectric waveguide can occur in different field configurations depending on the nature of the waveguide. These different field configurations are referred to as "modes". If only the basic mode is guided in a dielectric waveguide, the term "single-mode" waveguide is used in a manner analogous to the glass fiber. If, on the other hand, there is the possibility that the dielectric waveguide can guide several modes at the same time, it is referred to as a "multi-mode" waveguide. The number of modes a dielectric waveguide can guide essentially depends on the operating frequency and the geometry of the waveguide, in particular the size of its cross-sectional area (for example diameter of a round waveguide) and its permittivity (also called dielectric conductivity).

As with conventional data transmission technologies, the dispersion caused by the transmission medium is a critical component in the design thereof. The characteristic of a waveguide according to which signals or signal components of different frequencies propagate in the waveguide at different speeds is called dispersion. In addition to attenuation, dispersion is therefore a critical parameter that can limit the maximum achievable data rate. In the case of the dielectric waveguide, the dispersion can essentially be divided into two subtypes: the waveguide dispersion and the mode dispersion.

Waveguide dispersion describes the dispersion of the basic mode in which the data are usually transmitted and occurs in both single-mode and multi-mode waveguides.

Mode dispersion, on the other hand, relates to the different propagation speeds of the individual modes. If higher modes are excited by discontinuities at the transition to the dielectric waveguide or along the conductor, the usable power can be reduced during data transmission and the signal can be distorted, which can limit the maximum data rate that can be achieved.

In principle, the basic mode can be guided by the dielectric waveguide for any frequency. However, the field distribution and the propagation speed within the dielectric waveguide are dependent on frequency. While the basic mode has no lower limit frequency, all "higher modes" are only guided above an individual limit frequency. If a dielectric waveguide is thus used below the limit frequency of all higher modes, it is referred to as a "single-mode waveguide"; accordingly, a waveguide is referred to as a "mufti-mode waveguide" if at least one further mode can be guided in the frequency range used.

Multi-mode waveguides can have a lower waveguide dispersion than single-mode waveguides, but can lose this advantage due to any mode dispersion. This is particularly problematic when undesired modes are excited to an excessively high degree either by the transition from the transmitter or receiver to the dielectric waveguide or by discontinuities along the waveguide.

In order to be able to use dielectric waveguides in a transmission system, waveguide transitions on the dielectric waveguide are required, which transmit the electromagnetic wave, for example, from a planar circuit on a printed circuit board or from a highly integrated circuit (for example an MMIC, "monolithic microwave integrated circuit") to the dielectric waveguide.

For this purpose, it is known, on the one hand, to arrange the dielectric waveguide parallel to the circuit arrangement. The dielectric waveguide can then be excited by traveling waves, wherein the electromagnetic wave is guided continuously into the dielectric waveguide, comparable to a conical horn transition. Such waveguide transitions can be operated in a comparatively broadband fashion. Due to the two-dimensional structure, however, for example dual-polarization transitions for using both polarizations of the basic mode of the dielectric waveguide can only be implemented with difficulty.

It is also known to arrange dielectric waveguides perpendicular to the circuit arrangement. This usually requires resonant structures. The implementation of dual-polarization transitions can, however, be simplified in the case of a perpendicular arrangement.

To implement a waveguide transition for a dielectric waveguide arranged perpendicularly to the circuit arrangement, it is known from practice to use a metallic plate (a so-called "patch"), as a resonant structure, as part of the circuit arrangement, which is fed, for example, by means of a microstrip line of a printed circuit board and capable of exciting the electromagnetic wave in the dielectric waveguide.

The present invention is based on the object of providing an improved waveguide assembly, in particular providing a waveguide assembly with a high bandwidth.

The present invention is also based on the object of providing an improved waveguide transition in which, in particular, a high bandwidth can be ensured during the transition of the electromagnetic wave.

The invention is furthermore based on the object of providing an advantageous use of a waveguide assembly.

The claims and the features described herein also disclose advantageous embodiments and variants of the invention.

The invention is a waveguide assembly, comprising an electrical circuit arrangement, a dielectric waveguide with a longitudinal axis and a waveguide transition present in between for the transmission of an electromagnetic wave between the circuit arrangement and the dielectric waveguide.

An electromagnetic wave, in the context of the invention, means an electromagnetic wave that does not lie within the light spectrum used for optical signal transmission.

The invention is particularly suitable for the transmission of an electromagnetic wave in the millimeter range (30 GHz to 300 GHz) and sub-millimeter range (300 GHz to 3 THz).

The direction of transmission of the electromagnetic wave is not important in the context of the invention. Starting from the electrical circuit arrangement, the electromagnetic wave can thus be fed into the dielectric waveguide through via the waveguide transition—or vice versa. A bidirectional transmission is also possible within the scope of the invention. Insofar as reference is made herein to a transmission of the electromagnetic wave from the electrical circuit arrangement into the dielectric waveguide, this is only to be attributed to the simplified description of the invention and is not to be understood as restrictive.

The dielectric waveguide preferably has a round cross section. However, the dielectric waveguide does not necessarily have to have a circular geometry. The dielectric waveguide can, for example only, and without limitation, also be designed to be square or to have a square cross section.

The dielectric waveguide can be designed as a single-mode waveguide or as a multi-mode waveguide. The dielectric waveguide is preferably designed as a multi-mode waveguide.

The dielectric waveguide is preferably formed from a core material and a casing material encasing the core material.

The core material can preferably be a plastic or ceramic. Ceramics can advantageously be used for transitions between microchips, for example.

From an electrical point of view, the casing material is ideally air. However, a casing material consisting of any gas, any liquid or any solid can also be provided.

According to the invention, the waveguide transition has at least one first electrically conductive plate and a second electrically conductive plate, which are arranged between the electrical circuit arrangement and the dielectric waveguide in a manner offset from one another in the direction of the longitudinal axis of the dielectric waveguide (subsequently also referred to as "axial direction").

The first and second electrically conductive plates can be arranged in different axial planes between the circuit arrangement and the dielectric waveguide. The axial planes in which the respective electrically conductive plates are arranged can be distributed in the axial direction along the longitudinal axis of the dielectric waveguide or along the extended longitudinal axis of the dielectric waveguide.

The longitudinal axis can be the central axis of the dielectric waveguide.

The electrically conductive plates are preferably designed as metallic plates (also referred to as "patches").

The electrically conductive plates can form resonant structures.

The electrically conductive plates do not necessarily have to have a continuous surface, but can also be structured in themselves. For example only, and without limitation, at least one of the electrically conductive plates can be slotted or perforated.

Still further electrically conductive plates can also be provided within the scope of the invention. For example, a third electrically conductive plate can optionally be provided in a further axial plane between the first electrically conductive plate and the second electrically conductive plate. Furthermore, a fourth electrically conductive plate, a fifth electrically conductive plate, a sixth electrically conductive plate or even more electrically conductive plates can also be provided in different axial planes between the circuit arrangement and the dielectric waveguide. For easier understanding, however, the invention is described below with only two electrically conductive plates, but this is not to be understood as restrictive.

The first electrically conductive plate, the second electrically conductive plate and/or any further electrically conductive plates that may be present can be designed to be round, elliptical and/or rectangular, in particular also square.

Due to the inventive use of at least two electrically conductive plates, which can be arranged in the manner of a stack in different axial planes, the frequency bandwidth of the waveguide transition according to the invention and thus the frequency bandwidth of the waveguide assembly according to the invention can be significantly increased compared to the prior art.

A single resonant element used in the context of the prior art to excite the electromagnetic wave in the dielectric waveguide, in particular a single patch, is only able to provide a comparatively small frequency bandwidth. According to the invention, the frequency bandwidth can be increased by mounting the second electrically conductive plate "above" the first electrically conductive plate.

Insofar as the direction indication "above" is used in the context of the invention, this indication relates to an axial plane arranged closer to the dielectric waveguide than a further axial plane lying "below". The directional indications are intended to facilitate understanding of the invention, but are not intended to indicate a specific orientation of the waveguide assembly with regard to a center of gravity (for example the center of the earth).

The electrically conductive plates are preferably able to be electromagnetically coupled to one another, in particular in order to feed the electromagnetic wave into the dielectric waveguide.

The distance between the at least two electrically conductive plates and their geometry can determine the frequency bandwidth and the actual frequency position and can be determined, for example, on the basis of simulations, calculations and/or test series.

In the invention, it can be provided that the circuit arrangement is designed as an electrical circuit board, an integrated circuit, a system-in-package, a multi-chip module and/or a package-on-package.

In principle, any circuit arrangement can be provided, in particular a planar circuit arrangement, for example an electrical printed circuit board or a highly integrated circuit, in particular an MMIC ("monolithic microwave integrated circuit").

A preferred use of the invention can relate to chip-to-chip data transmission, wherein the circuit arrangement can be designed as an integrated circuit, for example can be designed as an application-specific integrated circuit (ASIC) or an MMIC. The waveguide transition can then, for example, be partly or completely arranged in a chip housing ("package"), wherein the dielectric waveguide can run/extend between the chip housings for high-bit-rate data transmission and possibly be passed through the chip housing.

In a preferred development of the invention, it can be provided that the longitudinal axis of the dielectric waveguide is oriented orthogonally to a surface of the electrical circuit arrangement, the surface facing the waveguide.

The invention can thus be used, in particular, to implement waveguide transitions to dielectric waveguides arranged perpendicular to planar circuits, with high frequency bandwidths being achievable.

In principle, it can be preferable if the dielectric waveguide is oriented perpendicular to the electrical circuit arrangement. However, deviations from a perpendicular arrangement can also occur, in particular due to tolerances. For example, it can be provided that the longitudinal axis of the dielectric waveguide is tilted up to 15 degrees, but preferably only up to 10 degrees, particularly preferably only up to 5 degrees, and very particularly preferably only up to 1 degree, to an ideally orthogonal orientation.

The surface of the electrical circuit arrangement to which the longitudinal axis of the dielectric waveguide is oriented orthogonally or at least approximately orthogonally can be, in particular, the top layer of the planar circuit, that is to say for example a printed circuit board or an integrated circuit.

Preferably, at least the first electrically conductive plate is arranged plane-parallel to the surface of the electrical circuit arrangement, the surface facing the waveguide.

In one configuration of the invention, it can be provided that the longitudinal axis of the dielectric waveguide is oriented orthogonally to a surface of the first electrically conductive plate and/or the second electrically conductive plate (and/or possibly further electrically conductive plates), the surface facing the waveguide. Tilting of the longitudinal axis, for example tolerance-related tilting up to 15 degrees, but preferably only up to 10 degrees, particularly preferably only up to 5 degrees, and very particularly preferably only up to 1 degree, to an ideally orthogonal orientation, can also be provided.

In the invention, it can be provided, in particular, that the first electrically conductive plate and the electrical circuit arrangement are designed and arranged relative to one another in such a way that the first electrically conductive plate is electromagnetically excited directly by the electrical circuit arrangement in order to transmit the electromagnetic wave.

The first electrically conductive plate, in particular a metallic plate, can preferably be designed as part or as an electrical component of the electrical circuit arrangement, in particular as a conductive metallized area of the electrical circuit arrangement.

It can also be provided that the electrical circuit arrangement for exciting the first electrically conductive plate has at least one electrical line, preferably has at least one microstrip line, in order to transmit the electromagnetic wave.

The electrical line for feeding the first plate is sometimes also referred to herein as feed line.

For example, it can be provided that the first electrically conductive plate and the electrical line, in particular the microstrip line of an electrical printed circuit board, are located on or in a common layer of the electrical circuit arrangement, for example on the top plane or top layer of an electrical printed circuit board.

The electrical line for exciting the first plate is preferably electrically conductively connected to the first electrically conductive plate. However, this is not absolutely necessary. In principle, the feed line or the electrical line for exciting the first electrically conductive plate can also be located in a deeper layer of the electrical circuit arrangement, for example a printed circuit board or an MMIC. The first electrically conductive plate can therefore also be fed via an electromagnetic field coupling.

A conductor or a conductive surface in the sense of a reference potential (reference conductor) can be provided for conductor-bound guiding of the electromagnetic wave, for example an electrically conductive base surface of the electrical circuit arrangement, which is arranged on a lower plane or in a lower plane or a lower layer of the electrical circuit arrangement. The reference conductor can be separated from the feed line in the axial direction in particular by a substrate layer. The reference conductor can guide an electrical reference signal or reference potential, in particular can guide a ground potential (GND) and thus form a ground reference.

Due to the spatially limited surface area of the electrically conductive plate, for example the first electrically conductive plate, a resonator can form through the boundary thereof and is fed, for example, by the at least one electrical line, for example the microstrip line of an electrical printed circuit board. The electrically conductive plates finally excite an electromagnetic wave in the dielectric waveguide, the wave then being guided through the dielectric waveguide.

The first resonance mode (TM-001 in the rectangular patch) of the electrically conductive plate and a symmetrical positioning of the dielectric waveguide and the second electrically conductive plate can be particularly suitable for exciting the basic mode of the dielectric waveguide intended for data transmission.

In the invention, it can be provided that the electrical circuit arrangement for exciting the first electrically conductive plate has a coplanar waveguide in order to transmit the electromagnetic wave.

In particular, the first electrically conductive plate can be fed by means of a coplanar waveguide of the GCPW type ("grounded coplanar waveguide").

In this case, the first electrically conductive plate can be fed, for example, by a coplanar waveguide, the inner conductor or feed line of which is preferably in the same plane or layer of the electrical circuit arrangement as the first electrically conductive plate. The feed line or the electrical line and the first electrically conductive plate can be surrounded by an electrically conductive reference layer at the level of the electrical circuit arrangement on which they are located and be electrically insulated from the same by corresponding slots. The reference layer can transmit an electrical reference potential, in particular a ground potential. The electrical circuit arrangement preferably has at least one further electrically conductive reference layer in at least one lower plane. The electrically conductive reference layer(s) of the lower planes can optionally be connected to the upper reference layer by means of vias.

By using a coplanar waveguide to feed the first electrically conductive plate, improved insulation from adjacent circuit parts and therefore a higher packing density can be achieved. In addition, there is a greater degree of freedom in the design of the circuit due to the coplanar feed.

In the invention, it can be provided that the electrical circuit arrangement is designed to excite the first electrically conductive plate in such a way that a dual-polarization transmission, in particular with orthogonal polarization, is formed.

In most modes of a dielectric waveguide, even in the basic mode, two field types can occur independently of one another at the same time and are polarized orthogonally to one another. In the most important special case of a round or square dielectric waveguide, these field types can exhibit an identical behavior, that is to say the fields also have the same propagation speeds. This identical behavior can advantageously be used to transmit two data streams independently of one another and thus ideally to double the data rate of the waveguide assembly.

The first electrically conductive plate can preferably be fed by two independent feed lines or waveguides of the electrical circuit arrangement, for example two independent electrical lines of the electrical circuit arrangement, in particular two microstrip lines, in order to provide a dual-polarization waveguide transition.

Advantageously, two mutually orthogonal polarizations of the basic mode can be excited independently of one another by means of the waveguide transition according to the invention in the dielectric waveguide, as a result of which different signals are transmitted and then converted back into two independent waveguides or electrical lines of a further circuit arrangement by a further dual-polarization waveguide transition.

For example, it can be provided that a first electrical line of the electrical circuit arrangement is positioned orthogonally to a second electrical line of the electrical circuit arrangement, preferably (but not necessarily) in the same plane or layer in order to excite the different resonance modes in the first electrically conductive plate, which subsequently are also polarized orthogonally to one another.

In the invention, it can be provided that the second electrically conductive plate is attached to an end face of the dielectric waveguide, the end face facing the electrical circuit arrangement, and/or is embedded in the dielectric waveguide.

The second electrically conductive plate can be applied on, or in, the dielectric waveguide, for example by additive metallization. It can also be provided, for example, that a 3D printing method is used in order to form the dielectric waveguide and/or the second electrically conductive plate (and possibly also further plates) in a common manufacturing process.

The second plate can, for example, be adhesively bonded and/or mechanically fastened to the end face of the dielectric waveguide.

It can also be provided that the second electrically conductive plate (or possibly also further electrically conductive plates) is embedded in the dielectric waveguide and is preferably fastened in the dielectric waveguide in a materially bonded, force-fitting and/or form-fitting manner.

In one configuration of the invention, it can also be provided that the first electrically conductive plate and the second electrically conductive plate are separated from one another in the direction of the longitudinal axis of the dielectric waveguide by a substrate layer of the electrical circuit arrangement.

The first electrically conductive plate and the second electrically conductive plate can be formed as part of the electrical circuit arrangement and, if necessary, embedded in the electrical circuit arrangement. This can also apply to any further electrically conductive plates that may be present.

In principle, it can be provided that each of the electrically conductive plates has any desired geometry (rectangular, round, etc.). However, it can be advantageous to adapt at least the second electrically conductive plate to the geometry or to the cross section of the dielectric waveguide.

In the invention, it can be provided that the second electrically conductive plate has a round cross section.

In one configuration of the invention it can also be provided that the first electrically conductive plate and/or any further electrically conductive plate that may be present has, or have, a round cross section.

If the dielectric waveguide has a round cross section, for example, it can be provided that the second electrically conductive plate is also designed to be round, as a result of which the positioning of the dielectric waveguide on the second electrically conductive plate can be rotationally invariant, which simplifies assembly.

It can also be provided that the dimensions of the cross-sectional geometry of the dielectric waveguide, in particular the diameter, are adapted to the dimensions of the cross-sectional geometry of the exciting electrically conductive plate or plates. In particular, it can be advantageous to design the diameters of the dielectric waveguide and of the second electrically conductive plate to be identical or similar in order to achieve the most efficient possible excitation of the desired basic mode of the dielectric waveguide.

In the invention, it can be provided that the electrically conductive plates are axially spaced from one another by at least one dielectric D.

The dielectric D can, for example, be a solid body that electrically insulates the electrically conductive plates from one another and to which the electrically conductive plates are optionally attached. The dielectric D can, however, also be air or some other gas.

In order to ensure the distance between, for example, the second electrically conductive plate and the first electrically conductive plate required to achieve the broadest possible excitation of the dielectric waveguide, the second electrically conductive plate can also be separated from the first electrically conductive plate (or further electrically conductive plates), for example be separated from one another by further substrate layers of the electrical circuit arrangement.

In order to reduce the manufacturing effort and the manufacturing costs and to further increase the coupling into the dielectric waveguide and the achievable frequency bandwidth, it can, however, be advantageous to embed the second electrically conductive plate in the dielectric waveguide.

In the invention, it can be provided that the electrically conductive plates are arranged plane-parallel to one another.

However, provision can also be made for an in particular tolerance-induced deviation of a plane-parallel arrangement of the electrically conductive plates in relation to one another, for example tilting of the electrically conductive plates by up to 15 degrees, but preferably only up to 10 degrees, particularly preferably only up to 5 degrees, and very particularly preferably only up to 1 degree, with respect to an ideally plane-parallel orientation.

In the invention, it can be provided, in particular, that the first electrically conductive plate, the second electrically conductive plate and/or the dielectric waveguide are arranged in the electromagnetic near field of the electrical circuit arrangement, in particular are spaced apart by less than the wavelength of the electromagnetic wave from the electrical circuit arrangement, preferably less than 50% of the wavelength of the electromagnetic wave from the electrical circuit arrangement, particularly preferably less than 10% of the wavelength of the electromagnetic wave from the electrical circuit arrangement.

The second electrically conductive plate is preferably arranged in the near field of the first electrically conductive plate.

The dielectric waveguide is preferably arranged in the near field of the second electrically conductive plate.

The first electrically conductive plate, the second electrically conductive plate, possibly further electrically conductive plates, the electrical circuit arrangement and/or the dielectric waveguide can each be arranged apart from one another by only fractions of the wavelength of the electromagnetic wave.

In the invention it can be provided that the waveguide transition has a waveguide piece, preferably a single-mode waveguide piece, which extends in the axial direction between the second electrically conductive plate and the dielectric waveguide.

The waveguide piece can preferably be designed to transmit only the basic mode. If the core material of the waveguide piece is made of plastic or ceramic, for example, and the casing material is made of air, the permittivity differences in the case of cross-sectional areas of the waveguide piece that at least approximately correspond to the cross-sectional areas of the exciting conductive plates can lead to the formation of a single-mode waveguide piece, which cannot guide higher modes.

In the present case, the term “higher modes” is to be understood as meaning all modes whose respective limit frequencies are above the limit frequency of the mode in which the data are intended to be transmitted. The data are preferably transmitted in the basic mode, possibly in different polarizations.

The waveguide piece can be formed separately from or in one piece with the dielectric waveguide.

It can also be provided that the waveguide transition has a waveguide transition piece, which extends between the waveguide piece and the dielectric waveguide in the axial direction (or in the direction of the longitudinal axis of the dielectric waveguide).

The waveguide transition piece can be formed separately from, or in one piece with, the waveguide piece.

It can also be provided that the waveguide transition piece forms a continuous transition or discretely stepped transition between the waveguide piece and the dielectric waveguide, in particular a transition between different cross sections and/or different permittivities of the waveguide piece and the dielectric waveguide.

In order to combine the advantages of an optimal excitation of the single-mode waveguide piece and a dispersion-minimized data transmission through a dielectric multimode waveguide, the single-mode waveguide piece can be excited by the second electrically conductive plate and then be guided through the waveguide transition piece into the multi-mode waveguide.

For this purpose, the waveguide transition piece can preferably have a continuous transition, for example linear or exponential, transition or a transition according to a monotonic section of a cosine function between the cross-sectional geometries of the waveguide piece and the dielectric waveguide, in particular their diameters.

A linear transition, exponential transition and/or a transition according to a monotonic section of a cosine function is particularly suitable as a continuous or section-wise continuous transition between different geometries, for example different cross-sectional areas of the waveguide piece and of the dielectric waveguide.

In the invention, it can be provided that the waveguide transition has a waveguide base, which has a first end for attachment to the circuit arrangement, wherein the first end has a cross section with a first diameter that is larger than a second diameter of a cross section of a second end of the waveguide base, the second end facing the dielectric waveguide.

The broad waveguide base can on the one hand be advantageous for attaching the dielectric waveguide to the electrical circuit arrangement and can also improve the coupling into the dielectric waveguide.

The waveguide base can have at least one axial section in which the diameter of the waveguide base is reduced in a conical manner. In particular, the waveguide base can have a cylindrical section adjoining the first end with a constant diameter and a subsequent conical section adjoining the second end.

To attach the dielectric waveguide to the circuit arrangement, the dielectric waveguide, the waveguide piece, the waveguide transition piece and/or the waveguide base is surrounded with a material, it is adhesively bonded to the electrical circuit arrangement and/or attached mechanically thereto.

The dielectric waveguide can be attached to the electrical circuit arrangement, for example, by means of support structures. The waveguide base itself can also be designed as such a support structure.

In the invention, it can be provided that the dielectric waveguide, the waveguide piece, the waveguide transition piece and/or the waveguide base is encased by a dielectric casing material whose permittivity is greater than the permittivity of air.

As has already been described above, the use of a waveguide base with a widened core cross-sectional area can lead to improved coupling into the dielectric waveguide. Due to the enlarged cross-sectional area, however, higher modes can be excited, for example if the dielectric waveguide is not positioned ideally. These higher modes are emitted at the transition between the waveguide base and the dielectric waveguide or the waveguide piece and thus the coupling efficiency may be reduced.

In order to ensure that the propagation of undesired modes is prevented, despite an increase in the cross-sectional area of the waveguide base, the waveguide piece, the waveguide transition piece and/or the dielectric waveguide, it can be provided that the permittivity ratio between the respective core material and the respective casing material can be selected such that the dielectric waveguide, the waveguide piece, the waveguide transition piece and/or the waveguide base is only able to guide a reduced number of modes, preferably in the manner of a single-mode waveguide. This can be achieved by way of an increased permittivity of the respective casing material in this area.

In particular, a casing material with a higher density and permittivity greater than air can be used, wherein the casing is then able to serve as an attachment at the same time, as a result of which the mechanical stability of the waveguide transition can be improved.

In this configuration, the waveguide transition piece can in particular also provide a transition between different permittivities of the core material and/or of the casing material. A (continuous or discretely stepped) transition of the permittivity of the casing material of the waveguide piece to the permittivity of the casing material of the dielectric waveguide can preferably be provided, for example by means of compounding, material density modification and/or joining of different materials.

Within the scope of the compounding procedure (mixing different materials), it is possible for example to use polymer alloys, a polyblend or to dope the material. The density of the dielectric waveguide piece can be modified, for example only, and without limitation, by compression, foaming or a different crystallization procedure.

Finally, it is also possible to geometrically assemble or combine multiple materials that in each case have different permittivities and finally overall form the dielectric waveguide, the waveguide piece and/or the waveguide transition piece. It is possible in this case to provide in particular a discretely stepped transition between the permittivities.

The following can apply to the diameter D of the first electrically conductive plate, of the second electrically conductive plate or of any further electrically conductive plates that may be present $$D \leq \frac{1.84}{\pi\sqrt{\varepsilon_r}} \cdot \lambda_0.$$

In which $\lambda_0$ is the free space wavelength and $\varepsilon_r$ is the relative permittivity of the material between the plates and/or between the first plate and the reference layer. In the millimeter wave range, the diameter of the conductive plates can thus be, for example, 0.1 mm to 1 mm, 1 mm to 5 mm, 5 mm to 10 mm or more. However, the diameter is preferably 1 mm or smaller.

The core material of the dielectric waveguide, the waveguide piece, the waveguide transition piece and/or the waveguide base can have, for example, a relative permittivity of 1.8 to 10.0, preferably 2.0 to 3.5, as a whole or at least in a section relevant to the invention.

The casing material of the dielectric waveguide, the waveguide piece, the waveguide transition piece and/or the waveguide base can have, for example, a relative permittivity of 1.0 to 3.0, preferably 1.0 to 2.0, as a whole or at least in a section relevant to the invention.

The dielectric waveguide, the waveguide piece, the waveguide transition piece and/or the waveguide base can, for example, be formed essentially from polyethylene or polytetrafluoroethylene. The dielectric waveguide, the waveguide piece, the waveguide transition piece and/or the waveguide base can also be formed essentially from polystyrene, which can be advantageous, in particular, because of its good processing properties.

In the invention, it can be provided that the dielectric waveguide, the waveguide piece, the waveguide transition piece and/or the waveguide base defines a recess to receive at least one of the electrically conductive plates, in particular the second electrically conductive plate.

It can be provided that the electrically conductive plate or plates is or are secured in the notch or recess in a materially bonded, force-fitting and/or form-fitting manner.

The depth of the recess can, in particular, define the distance or the axial distance between the electromagnetic coupled plates and thus determine the electrical behavior of the waveguide transition.

It can be provided that the recess is left filled with air, which can further minimize electrical losses and increase the frequency bandwidth. However, it can also be provided that the recess is filled with a solid after the insertion of the second electrically conductive plate (or another electrically conductive plate), for example filled with foam, in particular if the solid has a permittivity comparable to air.

The invention also relates to a waveguide transition for a waveguide assembly, for the transmission of an electromagnetic wave between an electrical circuit arrangement and a dielectric waveguide. The waveguide transition has at least one first electrically conductive plate and a second electrically conductive plate, which are arranged between the electrical circuit arrangement and the dielectric waveguide in a manner offset from one another in the direction of the longitudinal axis of the dielectric waveguide and designed to transmit the electromagnetic wave.

The at least two electrically conductive plates that are coupled to one another can produce two resonant frequencies, the position of which can be selected in such a way that the highest possible frequency bandwidth is achieved with high coupling efficiency and sufficiently good adaptation at the same time.

A stack of more than two electrically conductive plates can also be provided.

The waveguide transition relates, in particular, to a transition from planar microwave circuits and millimeter wave circuits to dielectric waveguides arranged perpendicular thereto.

The electrical circuit arrangement can be a printed circuit.

The waveguide assembly can be arranged, in particular, on a microchip, wherein the dielectric waveguide can be guided through the chip housing.

The invention furthermore relates to the use of a waveguide assembly for data transmission by means of electromagnetic waves.

The waveguide assembly can advantageously be provided for forming board-to-board connections or chip-to-chip connections and thereby in particular replace optical systems.

Use of a waveguide assembly according to the invention is not only advantageous for data transmission, but can also be used in other areas, such as (high-frequency) measurement technology, for example.

The invention is not to be understood as a specific and exclusive solution for dielectric waveguides for data transmission.

Features that have been disclosed and described in conjunction with the waveguide assembly can of course also be advantageously applied to the waveguide transition or to the described use—and vice versa. Advantages that have already been mentioned in conjunction with the waveguide assembly can furthermore also be understood as relating to the waveguide transition according to the invention and to the use—and vice versa.

In addition, it should be noted that expressions such as “comprising”, “having” or “with” do not exclude any other features or steps. Furthermore, expressions such as “a” or “the” that refer in the singular to steps or features do not exclude a plurality of steps or features—and vice versa.

Exemplary embodiments of the invention will be described in more detail below with reference to the drawing.

The Figures each show preferred exemplary embodiments in which individual features of the present invention are illustrated in combination with one another. Features of one exemplary embodiment may also be implemented separately from the other features of the same exemplary embodiment, and may accordingly be readily combined by an expert to form further useful combinations and sub-combinations with features of other exemplary embodiments.

Elements of identical function are denoted by the same reference designations in the brief descriptions of the Figures.

SUMMARY OF THE INVENTION

A principal aspect of the present invention is a waveguide assembly, comprising an electrical circuit arrangement, a dielectric waveguide with a longitudinal axis (A) and a waveguide transition present in between for the transmission of an electromagnetic wave between the circuit arrangement and the dielectric waveguide, having at least one first electrically conductive plate and a second electrically conductive plate, which are arranged between the circuit arrangement and the dielectric waveguide in a manner offset from one another in the direction of the longitudinal axis (A) of the dielectric waveguide, wherein the first electrically conductive plate is designed as a conductive metallized area of the circuit arrangement, wherein the circuit arrangement for exciting the first electrically conductive plate has at least one electrical line in order to transmit the electromagnetic wave.

A further aspect of the present invention is a waveguide assembly, characterized in that the circuit arrangement is designed as an electrical printed circuit board, an integrated circuit, a system-in-package, a multi-chip module and/or a package-on-package.

A further aspect of the present invention is a waveguide assembly characterized in that the longitudinal axis (A) of the dielectric waveguide is oriented orthogonally to a surface of the circuit arrangement, the surface facing the waveguide.

A further aspect of the present invention is a waveguide assembly characterized in that the first electrically conductive plate and the circuit arrangement are designed and arranged relative to one another in such a way that the first electrically conductive plate is electromagnetically excited directly by the circuit arrangement in order to transmit the electromagnetic wave.

A further aspect of the present invention is a waveguide assembly characterized in that the at least one electrical line is designed as a microstrip line and/or a coplanar waveguide.

A further aspect of the present invention is a waveguide assembly characterized in that the circuit arrangement is designed to excite the first electrically conductive plate in such a way that a dual-polarization transmission, in particular with orthogonal polarization, is formed.

A further aspect of the present invention is a waveguide assembly characterized in that the second electrically conductive plate is attached to an end face of the dielectric waveguide, the end face facing the circuit arrangement, and/or is embedded in the dielectric waveguide.

A further aspect of the present invention is a waveguide assembly characterized in that the electrically conductive plates are axially spaced apart from one another by at least one dielectric.

A further aspect of the present invention is a waveguide assembly characterized in that the second electrically conductive plate has a round cross section.

A further aspect of the present invention is a waveguide assembly characterized in that the electrically conductive plates are arranged plane-parallel to one another.

A further aspect of the present invention is a waveguide assembly characterized in that the first electrically conductive plate, the second electrically conductive plate and/or the dielectric waveguide are arranged in the electromagnetic near field of the circuit arrangement, in particular are spaced apart by less than the wavelength of the electromagnetic wave from the circuit arrangement, preferably are spaced apart less than 50% of the wavelength of the electromagnetic wave from the circuit arrangement, particularly preferably are spaced apart less than 10% of the wavelength of the electromagnetic wave from the circuit arrangement.

A further aspect of the present invention is a waveguide assembly characterized in that the waveguide transition has a waveguide piece, preferably a single-mode waveguide piece, which extends between the second electrically conductive plate and the dielectric waveguide in the direction of the longitudinal axis (A) of the dielectric waveguide.

A further aspect of the present invention is a waveguide assembly characterized in that the waveguide transition has a waveguide transition piece, which extends between the waveguide piece and the dielectric waveguide in the direction of the longitudinal axis (A) of the dielectric waveguide.

A further aspect of the present invention is a waveguide assembly as characterized in that the waveguide transition piece forms a continuous or discretely stepped transition between the waveguide piece and the dielectric waveguide, in particular a transition between different cross sections and/or different permittivities of the waveguide piece and the dielectric waveguide.

A further aspect of the present invention is a waveguide assembly characterized in that the waveguide transition has a waveguide base, which has a first end for attachment to the circuit arrangement, wherein the first end has a cross section with a first diameter that is larger than a second diameter of a cross section of a second end of the waveguide base, the second end facing the dielectric waveguide.

A further aspect of the present invention is a waveguide assembly characterized in that the dielectric waveguide, the waveguide piece, the waveguide transition piece and/or the waveguide base is encased by a dielectric casing material whose permittivity is greater than the permittivity of air.

A further aspect of the present invention is a waveguide assembly characterized in that the dielectric waveguide, the waveguide piece, the waveguide transition piece and/or the waveguide base has a recess in order to receive at least one of the electrically conductive plates.

A still further aspect of the present invention is a waveguide transition for the transmission of an electromagnetic wave between a circuit arrangement and a dielectric waveguide, having at least one first electrically conductive plate and a second electrically conductive plate, which are arranged between the circuit arrangement and the dielectric waveguide in a manner offset from one another in the direction of a longitudinal axis (A) of the dielectric waveguide and are designed to transmit the electromagnetic wave.

An even still further aspect of the present invention is a method for using a waveguide assembly for the transmission of data by means of electromagnetic waves.

These and other aspects of the present invention will be fully disclosed in more detail, as is required by the statutes, herein.

BRIEF DESCRIPTIONS OF THE FIGURES

In the Figures, in each case schematically:

DETAILED DESCRIPTION OF THE PREFERRED EMBODIMENTS

This disclosure of the invention is submitted in furtherance of the Constitutional purposes of the US Patent Laws "to promote the progress of science and useful arts" (Article 1, Section 8).

Figure 1:
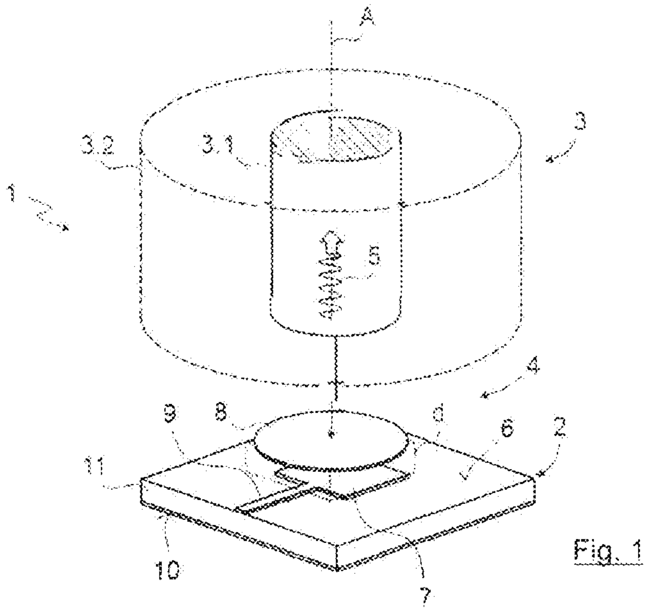
FIG. 1 shows a waveguide assembly according to the invention in accordance with a first embodiment, using an electrical conductor of the electrical circuit arrangement for exciting the first electrically conductive plate.

FIG. 1 shows a waveguide assembly 1 according to the invention in accordance with a first embodiment of the invention. The waveguide assembly 1 comprises an electrical circuit arrangement 2, a dielectric waveguide 3 and a waveguide transition 4 present in between for the transmission of an electromagnetic wave 5 between the electrical circuit arrangement 2 and the dielectric waveguide 3.

The electrical circuit arrangement 2 can be, for example, an electrical printed circuit board or an integrated circuit. It can also be a system-in-package, a multi-chip module and/or a package-on-package. The waveguide assembly 1 according to the invention can preferably be used for use with a printed circuit board or for a chip-to-chip communication connection. In the exemplary embodiments, the electrical circuit arrangement 2 is essentially described as a printed circuit board for the sake of simplicity, but this is not to be understood as restrictive.

The dielectric waveguide 3, illustrated as an example, has a core material 3.1 with a permittivity that is greater than the permittivity of the casing material 3.2 (cf. dashed line representation in FIG. 1), which runs/extends around the core material 3.1. The casing material 3.2 can also be air, for example. The casing material 3.2 can also, however, be a material that has a higher permittivity than air. In this way, the cross-sectional diameter of the core material 3.1 of the dielectric waveguide 3 can be increased without undesired modes becoming capable of propagation in the dielectric waveguide 3. In the disclosed exemplary embodiments, the casing material 3.2 of the dielectric waveguide 3 is not illustrated any further for the sake of simplicity.

The longitudinal axis A of the dielectric waveguide 3 is preferably oriented orthogonally to a surface 6 of the circuit arrangement 2, the surface facing the dielectric waveguide 3. In the context of the orthogonal orientation, however, tolerance-related deviations, for example a tilt of up to 15 degrees, can also be provided.

The waveguide transition 4 has at least one first electrically conductive plate 7 and a second electrically conductive plate 8, which are arranged in different axial planes between the electrical circuit arrangement 2 and the dielectric waveguide 3 and in a manner offset from one another in the direction of the longitudinal axis A of the dielectric waveguide 3 (that is to say in the axial direction). In principle, still further electrically conductive plates can also be provided, but these are not illustrated in the exemplary embodiments for the sake of simplification.

A configuration illustrated in the exemplary embodiments is preferably provided, according to which the first electrically conductive plate 7 and the electrical circuit arrangement 2 are designed and arranged relative to one another in such a way that the first electrically conductive plate 7 is electromagnetically excited directly by the electrical circuit arrangement 2 in order to transmit the electromagnetic wave 5. For this purpose, the electrical circuit arrangement 2 for exciting the first electrically conductive plate 7 can have at least one electrical line 9, as shown, for example, in the exemplary embodiment in FIG. 1.

The first electrically conductive plate 7 shown in the exemplary embodiment in FIG. 1 is designed to be rectangular, preferably square. The first electrically conductive plate 7 is conductively connected to an electrical line 9 in the form of a microstrip line, which, together with the first electrically conductive plate 7, is located in the top plane or layer of the electrical circuit arrangement 2 in the form of a printed circuit board. On the underside of the printed circuit board or electrical circuit arrangement 2, an electrically conductive base surface 10 is provided as a reference conductor, which is separated from the structures of the top layer of the printed circuit board by a non-conductive dielectric substrate 11 suitable for high frequencies.

In order to excite the first electrically conductive plate 7, it is fundamentally not absolutely necessary for the microstrip line or the electrical line 9 to be conductively connected to the first plate 7. An electromagnetic field coupling (not illustrated) can also be provided by, for example, an electrical line or strip line located in a lower plane of the printed circuit board or the electrical circuit arrangement 2.

Furthermore, the base surface 10 serving as an electrical (ground) reference does not necessarily have to be arranged on the underside of the electrical circuit arrangement 2 or the printed circuit board, but can, for example, also be arranged in a middle plane or layer. The base surface 10 or some other electrical reference can also be arranged at a distance from the printed circuit board or from the circuit arrangement 2, for example can be designed as a housing component, with air or preferably a solid material being able to be provided between the circuit arrangement and the housing component.

The first electrically conductive plate 7, the second electrically conductive plate 8 and/or the dielectric waveguide 3 can be arranged in the electromagnetic near field of the electrical circuit arrangement 2, in particular can be spaced apart by less than the wavelength of the electromagnetic wave 5 from the electrical circuit arrangement 2 (and/or from one another), preferably less than 50% of the wavelength of the electromagnetic wave 5 from the electrical circuit arrangement 2 (and/or from one another), particularly preferably less than 10% of the wavelength of the electromagnetic wave 5 from the electrical circuit arrangement 2 (and/or from one another).

For example, the dielectric waveguide 3 can be located directly on the surface of the second electrically conductive plate 8 facing the dielectric waveguide 3 or at a short distance above the surface of the second electrically conductive plate 8, with the result that the end of the dielectric waveguide 3 facing the second electrically conductive plate 8 is located in the near field of the second electrically conductive plate 8. Furthermore, the first electrically conductive plate 7 can be located directly on the electrical circuit arrangement 2 or at a small distance therefrom. Finally, the electrically conductive plates 7, 8 used can also be positioned within their near field relative to one another, for example axially spaced from one another by at least one dielectric (not illustrated).

The coupling efficiency and the type of excited modes within the dielectric waveguide 3 can depend on the positioning, orientation and/or cross-sectional area of the core material 3.1 of the dielectric waveguide 3, as well as dependent on the permittivities of the core material 3.1 and the casing material 3.2 and the resonance of the electrically conductive plates 7, 8.

The second electrically conductive plate 8 is arranged axially above the directly fed, first electrically conductive plate 7. Both electrically conductive plates are able to be electromagnetically coupled to one another, wherein the distance between the two electrically conductive plates 7, 8 and their geometry can be decisive for the frequency bandwidth and the actual frequency position.

In the exemplary embodiments, the second electrically conductive plate 8 is designed to be round, which can be particularly advantageous in order to position the dielectric waveguide 3, which is also round, in a rotationally invariant manner on the second electrically conductive plate 8 which can simplify assembly.

Figure 2:
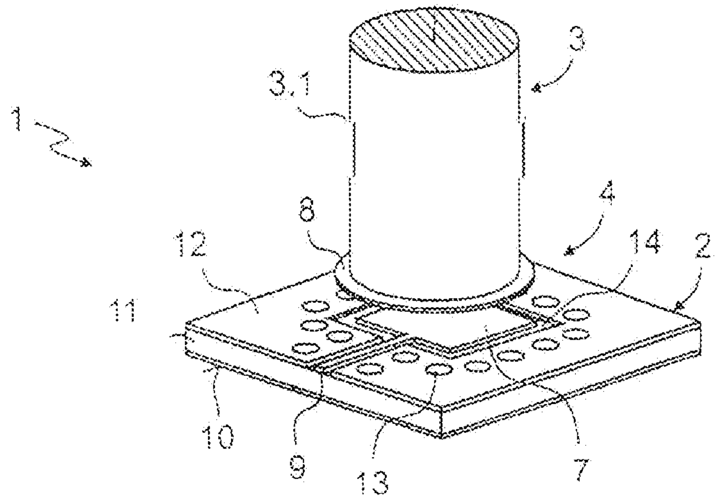
FIG. 2 shows a waveguide assembly according to the invention in accordance with a second embodiment, using a coplanar waveguide of the electrical circuit arrangement for exciting the first electrically conductive plate.

FIG. 2 illustrates a second exemplary embodiment of the waveguide assembly 1, in which the second electrically conductive plate 8 is attached to an end face of the dielectric waveguide 3, the end face facing the electrical circuit arrangement 2, and is arranged in the near field of the first electrically conductive plate 7.

In contrast to the electrically conductive plate 7 of FIG. 1, the electrically conductive plate 7 of FIG. 2 is fed by a coplanar waveguide of the circuit arrangement 2. The coplanar waveguide is designed in the manner of a GCPW ("grounded coplanar waveguide"). For this purpose, the electrical circuit arrangement 2 has a reference layer 12 in the top layer and optionally an electrically conductive base surface 10 in the bottom layer. The reference layer 12 and the base surface 10 are connected to one another by conductive vias 13. The first electrically conductive plate 7 is insulated from the reference layer 12 by a slot 14. In this way, the edges of the first electrically conductive plate 7 continue to form open ends with respect to the reference layer 12 and the base surface 10 and thus form a resonator.

In principle, even in the case of the coplanar waveguide, it is not absolutely necessary for the electrical line 9 to be arranged in an electrically conductive manner with the first electrically conductive plate 7 and/or with the second electrically conductive plate 8 in the same plane or layer.

Furthermore, the reference layer 12 can be made smaller and the number of vias 13 can be reduced.

Figure 3:
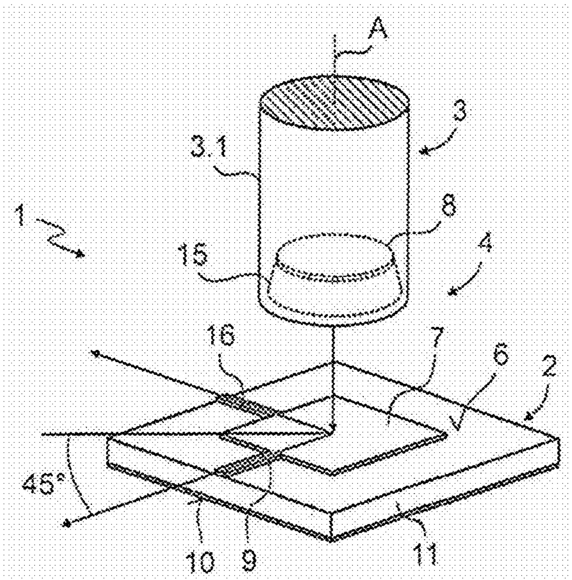
FIG. 3 shows a waveguide assembly according to the invention in accordance with a third embodiment with dual-polarization waveguide transmission and a second electrically conductive plate embedded in the dielectric waveguide.

FIG. 3 illustrates a further waveguide assembly 1 in accordance with a third embodiment, which combines two further aspects of the invention with one another by way of example.

The dielectric waveguide 3 illustrated in FIG. 3 has a recess 15 in which the second electrically conductive plate 8 is received. The distance between the electromagnetically coupled plates 7, 8 can be defined by the depth of the recess 15 and the electrical behavior of the waveguide transition 4 can thus be determined. The recess is preferably filled with air, but can also be completely or partly filled with a foam or other material. The losses of the waveguide assembly 1 can, however, as a rule be further minimized and the frequency bandwidth can be maximized if the recess 15 remains filled with air. The recess 15 can (as illustrated) run/extend conically or alternatively also cylindrically.

One possibility for mounting a conductive surface to form, for example, the second electrically conductive plate 8 on an inner surface of the recess 15 can be laser direct structuring (LDS), for example.

In the exemplary embodiment of FIG. 3, the circuit arrangement 2 is also designed to excite the first electrically conductive plate 7 in such a way that a dual-polarization transmission with orthogonal polarization is formed. The first electrically conductive plate 7 of the circuit arrangement 2, which excites the second electrically conductive plate 8, is in this case fed by the (first) microstrip line or electrical line 9 and also by a second microstrip line or second electrical line 16 positioned orthogonally to the first electrical line 9. Accordingly, two different resonance modes can be excited in the first electrically conductive plate 7, which are polarized orthogonally to one another. The resonance modes are able to excite the dielectric waveguide 3, which is preferably positioned in the center and is as perpendicular as possible, with two mutually orthogonal and thus independent polarizations of the basic mode via the second electrically conductive plate 8, which polarizations are then guided independently of each other via the dielectric waveguide 3.

In this variant, too, it is not absolutely necessary for the feed lines or the electrical lines 9, 16 to be electrically conductively connected to the first electrically conductive plate 7. The electrical lines 9, 16 can, for example, also be arranged in a lower plane of the printed circuit board or electrical circuit arrangement 2 and feed the first electrical plate 7 by means of electromagnetic field coupling.

Furthermore, the first electrically conductive plate 7 does not necessarily have to be designed to be rectangular or square, but can also be round or elliptical. In the case of dual-polarization excitation, however, the first electrically conductive plate 7 is preferably designed to be square or circular.

In addition, it is also not necessary for the microstrip lines or the electrical lines 9, 16 to run/extend centrally towards the first electrically conductive plate 7 and perpendicular to one another at 45° from a mutually adjacent corner of the first electrically conductive plate 7, as illustrated. The feed lines 9, 16 can each also have a lateral offset. A lateral offset of at least one of the electrical lines 9, 16 can, for example, improve the insulation from the different modes in the dielectric waveguide 3 or the insulation from the modes of both electrical lines 9, 16.

It should be noted that the aspect of the invention relating to a recess 15 for receiving the second electrically conductive plate 8, for example, and the aspects of dual-polarization waveguide transmission can of course also be implemented independently of one another and are only illustrated by way of example in combination in the exemplary embodiment in FIG. 3. As already mentioned at the beginning, these aspects of the invention apply in principle to all further developments and features of the invention illustrated and described in the exemplary embodiments.

Figure 4:
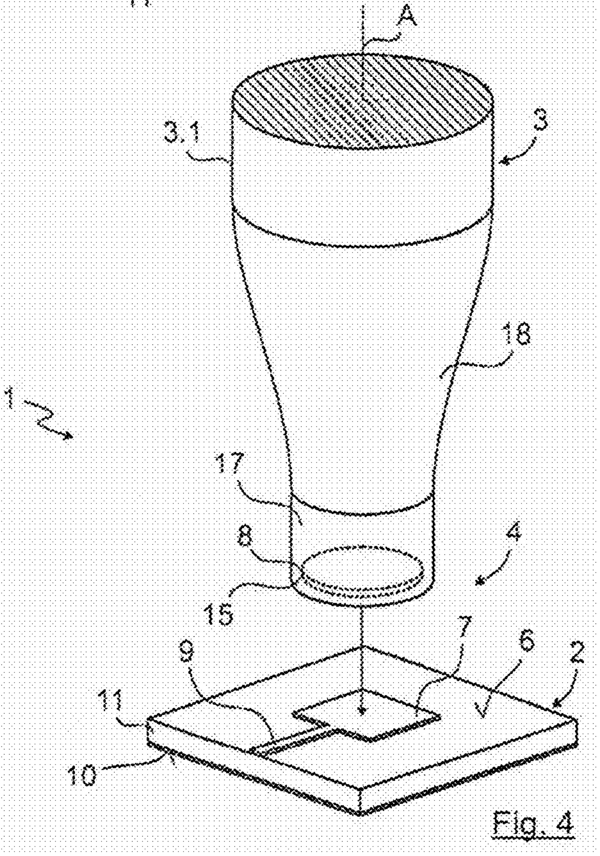
FIG. 4 shows a waveguide assembly according to the invention in accordance with a fourth embodiment with a waveguide piece and a waveguide transition piece.

FIG. 4 illustrates a further exemplary embodiment of the invention. The waveguide transition 4 has a waveguide piece 17, preferably a single-mode waveguide piece, which extends between the first electrically conductive plate 7 and the dielectric waveguide 3 in the axial direction along the extended longitudinal axis A of the dielectric waveguide 3.

The second electrically conductive plate 8 is preferably embedded in the waveguide piece 17; a recess 15, for example, can be provided for this purpose, as has already been described in FIG. 3 with respect to the dielectric waveguide 3. However, the second electrically conductive plate 8 does not necessarily have to be embedded in the waveguide piece 17, but can also merely be placed on an end face of the waveguide piece 17 or be further spaced from the waveguide piece in the axial direction.

Furthermore, the waveguide transition 4 has a waveguide transition piece 18, which extends between the waveguide piece 17 and the dielectric waveguide 3 in the axial direction along the longitudinal axis A of the dielectric waveguide 3. The waveguide transition piece 18 forms a continuous transition between the waveguide piece 17 and the dielectric waveguide 3 in order to adjust the different cross sections to one another.

In order to achieve the most efficient possible excitation of the desired basic mode of the dielectric waveguide 3, it can in principle be advantageous to adapt the dimensions of the dielectric waveguide 3 to the dimensions of the exciting plate, that is to say in particular the size or the diameter of the second electrically conductive plate 8, and to choose the diameter of the dielectric waveguide 3 to be as similar as possible. In particular, if this is not easily possible, the waveguide transition piece 18 can be used for adjustment.

In order to avoid the undesired excitation of higher modes in the waveguide transition 4 (for example, even if the dielectric waveguide 3 is not positioned ideally), a waveguide piece 17 designed as a single-mode waveguide piece can be attached, together with the second electrically conductive plate 8, above the first electrically conductive plate 7 and then transferred through the waveguide transition piece 18 into a dielectric waveguide 3 designed as a multimode waveguide.

However, the waveguide transition piece 18 does not necessarily have to continuously (for example in a cosine, linear or exponential manner) transform the geometry of the waveguide piece 17 and the dielectric waveguide 3 into one another, as shown in FIG. 4, but can also form a discretely stepped transition with any desired number of steps.

It can also be provided that the waveguide transition piece 18 forms a continuous or discretely stepped transition between different permittivities of the waveguide piece 17 and the dielectric waveguide 3, in particular with regard to their core materials and/or casing materials.

Figure 5:
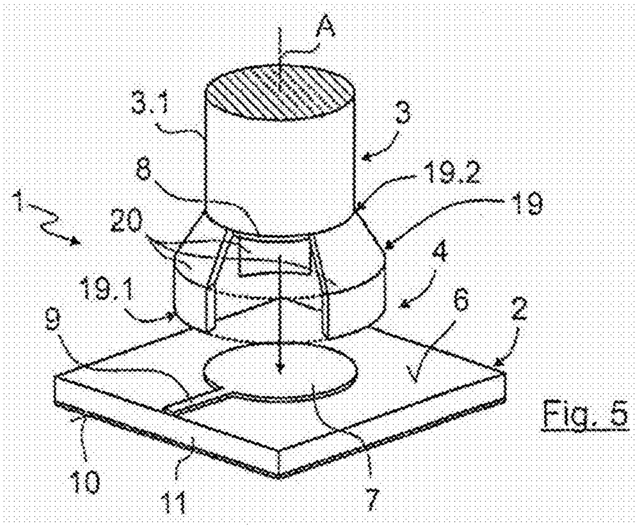
FIG. 5 shows a waveguide assembly according to the invention in accordance with a fifth embodiment with a waveguide base.

FIG. 5 shows an exemplary embodiment of the invention in which the waveguide transition 4 has a waveguide base 19, which has a first end 19.1 for attachment to the electrical circuit arrangement 2, wherein the first end 19.1 has a cross section with a first diameter that is larger than a second diameter of a cross section of a second end 19.2 of the waveguide base 19, the second end facing the dielectric waveguide 3.

The waveguide base 19 can have an annular cross section (in particular a round annular cross section) or a cross section with a plurality of ring segments 20, as illustrated in FIG. 5. For example, the widespread base can serve for improved attachment of the dielectric waveguide 3 on the electrical circuit arrangement 2 and can be designed in the manner of supports.

The second electrically conductive plate 8 can be accommodated within the waveguide base 19. The waveguide base 19 is preferably designed to be hollow or has a recess 15, as illustrated in FIG. 6.

In principle, a widening of the cross-sectional area of the dielectric waveguide 3 through the waveguide base 19 in the waveguide transition 4 can make improved coupling into the dielectric waveguide 3 possible if the dimensions are correct. In addition, a widening of the cross-sectional area through the waveguide base 19 can also be used for the defined positioning of the dielectric waveguide 3.

As already mentioned, the illustrated developments and variants of the invention can be combined with one another as desired. A combination to be understood purely as an example is illustrated in FIG. 6.

Figure 6:
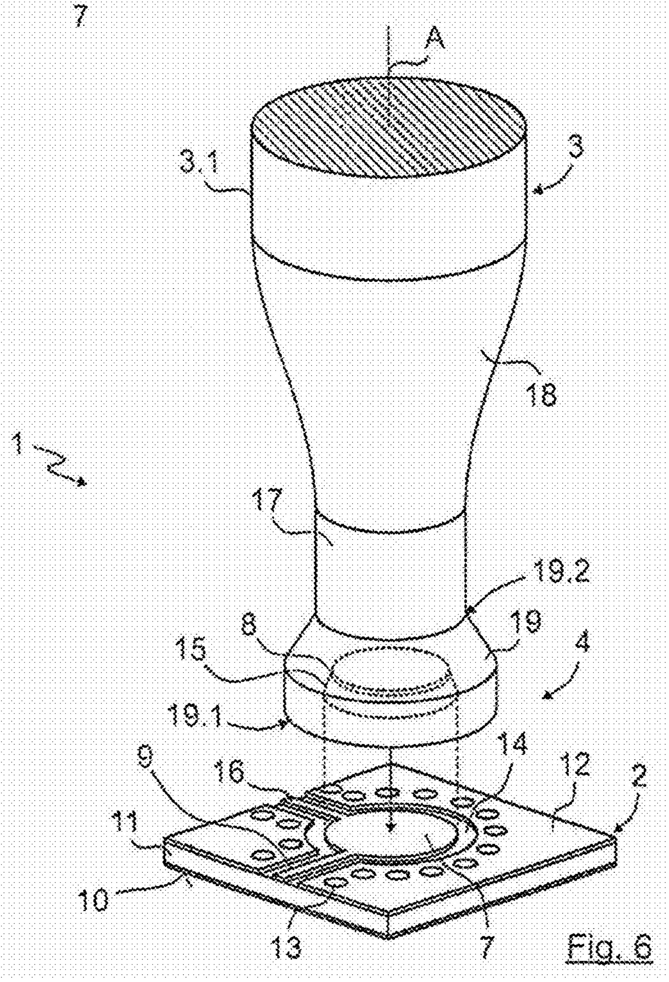
FIG. 6 shows a waveguide assembly according to the invention in accordance with a sixth embodiment with dual-polarization transmission, a coplanar waveguide of the electrical circuit arrangement for exciting the first electrically conductive plate, a waveguide piece, a waveguide transition piece and a waveguide base.

For improved coupling and attachment, the waveguide transition 4 according to the exemplary embodiment in FIG. 6 has a waveguide base 19 with the second electrically conductive plate 8 received therein. The waveguide piece 17 and the waveguide transition piece 18 are arranged between the waveguide base 19 and the dielectric waveguide 3. At this point it should be mentioned that the dielectric waveguide 3, the waveguide piece 17, the waveguide transition piece 18 and/or the waveguide base 19 can also be formed in one piece.

The first electrically conductive plate 7 is excited by two identical coplanar waveguides, as described in the context of FIG. 2, whereby dual-polarization use is possible and parasitic radiation can be reduced compared to excitation by simple microstrip lines or electrical lines 9, 16. By way of example, the first electrically conductive plate 7 in FIGS. 5 and 6 is designed to be round. As a result, the assembly of the waveguide assembly 1 can be simplified and incorrect orientations can be prevented.

The increased base surface within the waveguide base 19 can improve the transmission into the dielectric waveguide 3. The reduction in diameter in the waveguide base 19 in the direction of the waveguide piece 17 can further improve the transmission and prevent the guidance of undesired modes of the dielectric waveguide 3, which are instead emitted at the conical reduction.

Finally, the continuous widening of the cross-sectional area of the core material by the waveguide transition piece 18 can make the excitation of a multi-mode waveguide 3 possible while preventing the excitation of higher modes.

To attach the dielectric waveguide 3 and/or the waveguide transition 4 to the electrical circuit arrangement 2, the waveguide transition 4 and/or the dielectric waveguide 3 can be adhesively bonded, mechanically attached and/or foamed onto the electrical circuit arrangement 2. Foaming can preferably be effected by means of a material having a permittivity that corresponds approximately to the permittivity of air. For example only, and without limitation, polystyrene foam, including that known under the brand “STYRODUR” from the BASF Group or “ROHACELL” from EVONIK, can be suitable for foaming. A comparable material can of course also be suitable.

Operation

Having thus described the structure of our Waveguide Assembly, Waveguide Transition, and Use of a Waveguide Assembly its operation is briefly described.

A data transmission assembly is provided wherein an electrical signal is modulated onto a carrier frequency, in particular in the millimeter wave range (for example 80 GHz) so as to transmit very high data rates, for example in the rage of 50 GB/s over a distance. The electrical signal is transmitted as an electromagnetic wave along a dielectric waveguide that is characterized as is disclosed herein.

A principal object of the present invention is a waveguide assembly (1), comprising: an electrical circuit arrangement; (2), a dielectric waveguide (3) having a longitudinal axis (A); and a waveguide transition (4) positioned between the electrical circuit arrangement (2) and the dielectric waveguide (3) for the transmission of an electromagnetic wave (5) between the circuit arrangement (2) and the dielectric waveguide (3), the waveguide transition (4) having a first electrically conductive plate (7) and a second electrically conductive plate (8), and the first electrically conductive plate (7) and the second electrically conductive plate (8) are arranged between the circuit arrangement (2) and the dielectric waveguide (3) and are offset from one another in the direction of the longitudinal axis (A) of the dielectric waveguide (3), and wherein the first electrically conductive plate (7) is a conductive metallized area of the electrical circuit arrangement (2), and wherein the electrical circuit arrangement (2) for exciting the first electrically conductive plate (7) has an electrical line (9, 16) to transmit the electromagnetic wave (5).

A further object of the present invention is a waveguide assembly (1) and wherein the electrical circuit arrangement (2) is at least one of an electrical printed circuit board, an integrated circuit, a system-in-package, a multi-chip module, and a package-on-package.

A further object of the present invention is a waveguide assembly (1) and wherein the longitudinal axis (A) of the dielectric waveguide (3) is oriented orthogonally to a surface (6) of the electrical circuit arrangement (2), the surface of the electrical circuit arrangement (2) facing the dielectric waveguide (3).

A further object of the present invention is a waveguide assembly (1) and wherein the first electrically conductive plate (7) and the electrical circuit arrangement (2) are arranged relative to one another so the first electrically conductive plate (7) is electromagnetically excited directly by the electrical circuit arrangement (2) to transmit the electromagnetic wave (5).

A further object of the present invention is a waveguide assembly (1) wherein the electrical line (9, 16) is a microstrip line or a coplanar waveguide.

A further object of the present invention is a waveguide assembly (1) wherein the electrical circuit arrangement (2) excites the first electrically conductive plate (7) so that a dual-polarization transmission is formed.

A further object of the present invention is a waveguide assembly (1) wherein the second electrically conductive plate (8) is attached to an end face of the dielectric waveguide (3), the end face of the dielectric waveguide (3) facing the electrical circuit arrangement (2).

A further object of the present invention is a waveguide assembly (1) wherein the first and second electrically conductive plates (7, 8) are axially spaced apart from one another by a dielectric.

A further object of the present invention is a waveguide assembly (1) wherein the second electrically conductive plate (8) has a round cross section.

A further object of the present invention is a waveguide assembly (1) wherein the first and second electrically conductive plates (7, 8) are plane-parallel to one another.

A further object of the present invention is a waveguide assembly (1) wherein at least one of the first electrically conductive plate (7), the second electrically conductive plate (8) and the dielectric waveguide (3) are in an electromagnetic near field of the electrical circuit arrangement (2), and are spaced apart from the electrical circuit arrangement (2) by a distance that is less than a wavelength of the electromagnetic wave (5).

A further object of the present invention is a waveguide assembly (1) further comprising: a waveguide piece (17), which extends between the second electrically conductive plate (8) and the dielectric waveguide (3) in the direction of the longitudinal axis (A) of the dielectric waveguide (3).

A further object of the present invention is a waveguide assembly (1) further comprising: a waveguide transition piece (18), that extends between the waveguide piece (17) and the dielectric waveguide (3) in the direction of the longitudinal axis (A) of the dielectric waveguide (3).

A further object of the present invention is a waveguide assembly (1) wherein the waveguide transition piece (18) forms at least one of a continuous transition or discretely stepped transition between the waveguide piece (17) and the dielectric waveguide (3).

A further object of the present invention is a waveguide assembly (1) and further comprising: a waveguide base (19), which has a first end (19.1) for attachment to the electrical circuit arrangement (2), and a second end facing the dielectric waveguide; and wherein the first end (19.1) of the waveguide base (19) has a cross section that has a first diameter and the second end (19.2) of the waveguide base (19) has a cross section that has a second diameter, and the first diameter is larger than the second diameter.

A further object of the present invention is a waveguide assembly (1) wherein at least one of the dielectric waveguide (3), the waveguide piece (17), the waveguide transition piece (18) and the waveguide base (19) is encased by a dielectric casing material (3.2) that has a permittivity greater than the permittivity of air.

A further object of the present invention is a waveguide assembly (1) wherein at least one of the dielectric waveguide (3), the waveguide piece (17), the waveguide transition piece (18) and the waveguide base (19) defines a recess (15) to receive at least one of the first or second electrically conductive plates (7, 8).

A further object of the present invention is a waveguide transition (4) for the transmission of an electromagnetic wave (5) the waveguide transition (4) comprising: a first electrically conductive plate (7) and a second electrically conductive plate (8), and the first electrically conductive plate (7) and the second electrically conductive plate (8) can be arranged between a circuit arrangement (2) and a dielectric waveguide (3) and the first electrically conductive plate (7) and the second electrically conductive plate (8) are offset from one another and the first electrically conductive plate (7) and the second electrically conductive plate (8) transmit the electromagnetic wave (5).

A further object of the present invention is a method for using a waveguide assembly (1), the method comprising the steps: providing an electrical circuit arrangement (2); providing a dielectric waveguide (3) having a longitudinal axis (A); and providing a waveguide transition (4) that is positioned between the electrical circuit arrangement (2) and the dielectric waveguide (3) for transmission of an electromagnetic wave (5) between the electrical circuit arrangement (2) and the dielectric waveguide (3), the waveguide transition (4) having a first electrically conductive plate (7) and a second electrically conductive plate (8), and the first electrically conductive plate (7) and the second electrically conductive plate (8) are arranged between the electrical circuit arrangement (2) and the dielectric waveguide (3) and are offset from one another in the direction of the longitudinal axis (A) of the dielectric waveguide (3), and wherein the first electrically conductive plate (7) is a conductive metallized area of the electrical circuit arrangement (2), and wherein the electrical circuit arrangement (2) has an electrical line (9, 16) to transmit the electromagnetic wave (5) for exciting the first electrically conductive plate (7); and data is transmitted by the waveguide assembly (3) by means of electromagnetic waves (5).

A further object of the present invention is a waveguide assembly (1) further comprising: a support structure for attaching the dielectric waveguide (3) to the electrical circuit arrangement (2).

A further object of the present invention is a waveguide assembly (1) wherein the second electrically conductive plate (8) is embedded in the dielectric waveguide (3).

A still further object of the present invention is a waveguide assembly (1) wherein the waveguide base (19) has a round annular cross section or a cross section with a plurality of ring segments.

An even still further object of the present invention is a waveguide assembly (1) wherein the waveguide piece (17) is a single-mode waveguide piece.

In compliance with the statute, the present invention has been described in language more or less specific, as to structural and methodical features. It is to be understood, however, that the invention is not limited to the specific features shown and described since the means herein disclosed comprise preferred forms of putting the invention into effect. The invention is, therefore, claimed in any of its forms or modifications within the proper scope of the appended claims appropriately interpreted in accordance with the Doctrine of Equivalents.

The invention claimed is:

1. A waveguide assembly, comprising:

an electrical circuit arrangement;

a dielectric waveguide having a longitudinal axis (A); and a waveguide transition positioned between the electrical circuit arrangement and the dielectric waveguide for the transmission of an electromagnetic wave between the electrical circuit arrangement and the dielectric waveguide, the waveguide transition having a first electrically conductive plate and a second electrically conductive plate, and the first electrically conductive plate and the second electrically conductive plate are arranged between the electrical circuit arrangement and the dielectric waveguide and are offset from one another in the direction of the longitudinal axis (A) of the dielectric waveguide, and wherein the first electrically conductive plate is a conductive metallized area of the circuit arrangement, and wherein the circuit arrangement has an electrical line to transmit the electromagnetic wave for exciting the first electrically conductive plate; and wherein the second electrically conductive plate is embedded in the dielectric waveguide.

2. The waveguide assembly as claimed in claim 1, and wherein the electrical circuit arrangement is at least one of an electrical printed circuit board, an integrated circuit, a system-in-package, a multi-chip module, and a package-on-package.

3. The waveguide assembly as claimed in claim 1 and wherein the longitudinal axis (A) of the dielectric waveguide is oriented orthogonally to a surface of the electrical circuit arrangement, said surface of the electrical circuit arrangement facing the dielectric waveguide.

4. The waveguide assembly as claimed in claim 1 and wherein the electrical line is a microstrip line or a coplanar waveguide.

5. The waveguide assembly as claimed in claim 1 and wherein the electrical circuit arrangement excites the first electrically conductive plate so that a dual-polarization electromagnetic wave transmission, is formed.

6. The waveguide assembly as claimed in claim 1 and further comprising:

a support structure for attaching the dielectric waveguide to the electrical circuit arrangement.

7. The waveguide assembly as claimed in claim 1 and wherein the first and second electrically conductive plates are axially offset from one another by a dielectric.

8. The waveguide assembly as claimed in claim 1 and wherein the second electrically conductive plate has a round cross section.

9. The waveguide assembly as claimed in claim 1 and wherein the first and second electrically conductive plates are parallel to one another.

10. The waveguide assembly as claimed in claim 1 and wherein at least one of the first electrically conductive plate, the second electrically conductive plate and the dielectric waveguide are in an electromagnetic near field of the electrical circuit arrangement, and are spaced apart from the electrical circuit arrangement by a distance that is less than a wavelength of the electromagnetic wave.

11. The waveguide assembly as claimed in claim 1 further comprising:

a waveguide piece, which extends between the second electrically conductive plate and the dielectric waveguide in the direction of the longitudinal axis (A) of the dielectric waveguide.

12. The waveguide assembly as claimed in claim 11 further comprising:

a waveguide transition piece, that extends between the waveguide piece and the dielectric waveguide in the direction of the longitudinal axis (A) of the dielectric waveguide.

13. The waveguide assembly as claimed in claim 12 and wherein the waveguide transition piece forms at least one of a continuous transition or discretely stepped transition between the waveguide piece and the dielectric waveguide.

14. The waveguide assembly as claimed in claim 12 further comprising:

a waveguide base, which has a first end for attachment to the circuit arrangement, and a second end facing the dielectric waveguide; and wherein the first end of the waveguide base has a cross section that has a first diameter and the second end of the waveguide base has a cross section that has a second diameter, and the first diameter is larger than the second diameter.

15. The waveguide assembly as claimed in claim 14 and wherein at least one of the dielectric waveguide, the waveguide piece, the waveguide transition piece and the waveguide base is encased by a dielectric casing material that has a permittivity greater than the permittivity of air.

16. The waveguide assembly as claimed in claim 14 and wherein at least one of the dielectric waveguide, the waveguide piece, the waveguide transition piece and the waveguide base defines a recess to receive at least one of the first or second electrically conductive plates.

17. The waveguide assembly as claimed in claim 14 and wherein the waveguide base has a round annular cross section or a cross section with a plurality of ring segments.

18. The waveguide assembly as claimed in claim 11 and wherein the waveguide piece is a single-mode waveguide piece.

19. A waveguide transition for transmission of an electromagnetic wave, the waveguide transition comprising:

a first electrically conductive plate and a second electrically conductive plate, and the first electrically conductive plate and the second electrically conductive plate can be arranged between an electrical circuit arrangement and a dielectric waveguide and the first electrically conductive plate and the second electrically conductive plate are offset from one another, and the first electrically conductive plate and the second electrically conductive plate transmit the electromagnetic wave; and wherein the second electrically conductive plate is embedded in the dielectric waveguide.

20. The waveguide assembly as claimed in claim 19 and further comprising:

a support structure for attaching the dielectric waveguide to the electrical circuit arrangement.

21. A method for using a waveguide assembly, the method comprising the steps:

providing an electrical circuit arrangement;

providing a dielectric waveguide having a longitudinal axis (A); and providing a waveguide transition that is positioned between the electrical circuit arrangement and the dielectric waveguide for transmission of an electromagnetic wave between the electrical circuit arrangement and the dielectric waveguide, the waveguide transition having a first electrically conductive plate and a second electrically conductive plate, and the first electrically conductive plate and the second electrically conductive plate are arranged between the electrical circuit arrangement and the dielectric waveguide and are offset from one another in the direction of the longitudinal axis (A) of the dielectric waveguide, and wherein the first electrically conductive plate is a conductive metallized area of the electrical circuit arrangement, and wherein the electrical circuit arrangement has an electrical line to transmit the electromagnetic wave for exciting the first electrically conductive plate; and data is transmitted by the waveguide assembly by means of the electromagnetic wave; and wherein the second electrically conductive plate is embedded in the dielectric waveguide.

* * * * *